(12) United States Patent
Kang et al.

(10) Patent No.: US 6,662,021 B2
(45) Date of Patent: Dec. 9, 2003

(54) MOBILE COMMUNICATION SYSTEM HAVING MULTI-BAND ANTENNA

(75) Inventors: Jun-Kyu Kang, Seoul (KR); Dong-In Ha, Seoul (KR); Wan-Jin Choi, Suwon-shi (KR); Jung-Ho Park, Yongin-shi (KR); Dong-Hwan Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/272,341

(22) Filed: Oct. 15, 2002

(65) Prior Publication Data

US 2003/0153279 A1 Aug. 14, 2003

(30) Foreign Application Priority Data

Oct. 13, 2001 (KR) ...................................... P2001/63239

(51) Int. Cl.$^7$ .............................. H04B 1/38; H04M 1/00
(52) U.S. Cl. ........................ 455/553; 455/552; 455/568; 343/895
(58) Field of Search .............................. 455/90.1, 575.1, 455/550, 552.1, 553.1, 568.7, 73, 82, 403, 404.1; 343/702, 895, 725–728

(56) References Cited

U.S. PATENT DOCUMENTS

| | | | | |
|---|---|---|---|---|
| 6,016,130 | A | * 1/2000 | Annamaa | 343/895 |
| 6,172,655 | B1 | * 1/2001 | Volman | 343/895 |
| 6,359,940 | B1 | * 3/2002 | Ciccarelli et al. | 375/316 |
| 2003/0040292 | A1 | * 2/2003 | Peterzell et al. | 455/147 |
| 2003/0069036 | A1 | * 4/2003 | Forrester | 455/552 |

OTHER PUBLICATIONS

"Multi–band smart patch antenna for GPS/PCS hand–held units" Elkamchouchi, H.M.; El–Dien, H.; Hafez, M.; Microwave and Millimeter Wave Technology, 2002. Proceedings. ICMMT 2002. 2002 3rd International Conference on, Aug. 17–19, 2002.*

"A broad–band miniature dielectric–loaded personal telephone antenna–with low SAR" Leisten, O.; Agboraw, E.; Nicolaidis, G.; Dowsett, M.; Electromagnetic Assessment and Antenna Design Relating To Health Implications of Mobile Phones (Ref. No. 1999/043), I.*

* cited by examiner

Primary Examiner—Nay Maung
Assistant Examiner—Edan Orgad
(74) Attorney, Agent, or Firm—Dilworth & Barrese LLP

(57) ABSTRACT

A mobile communication system has a multi-band antenna capable of receiving and processing signals of GPS, CDMA, and PCS bands. In the system, a GPS processing section receives a signal of a first frequency band, so as to generate global positioning information. A communication signal processing section receives signals of a second frequency band lower than the first frequency band and a third frequency band higher than the first frequency band, demodulates the received signals, while modulating signals to be transmitted of the second frequency band and the third frequency band and outputting the modulated signals. The multi-band antenna has a dual-pitch helical antenna which includes first and second helical coil portions having different pitches, so that the first and second helical coil portions have different impedances for the signals of the first to third frequency bands. A frequency band separator section connected between the multi-band antenna and the GPS processing section and communication processing section supplies the signal of the first frequency band to the GPS processing section while supplying the signals of the second and third frequency bands to the communication processing section.

8 Claims, 21 Drawing Sheets

FIG.2 RETRACTED STATE

EXTENDED STATE

GPS BAND IMPEDANCE MATCHING CHARACTERISTICS

CDMA BAND ANTENNA GAIN PATTERNS
-RETRACTED STATE

CDMA BAND ANTENNA GAIN PATTERNS
—EXTENDED STATE

PCS BAND ANTENNA GAIN PATTERNS
-RETRACTED STATE

PCS BAND ANTENNA GAIN PATTERNS
—EXTENDED STATE

GPS BAND ANTENNA GAIN PATTERNS

RETRACTED STATE

FIG.12 EXTENDED STATE

GPS BAND IMPEDANCE MATCHING CHARACTERISTICS
– RETRACTED STATE

GPS BAND IMPEDANCE
MATCHING CHARACTERISTICS
- EXTENDED STATE

CDMA BAND ANTENNA GAIN PATTERNS
– RETRACTED STATE

CDMA BAND ANTENNA GAIN PATTERNS
– EXTENDED STATE

PCS BAND ANTENNA GAIN PATTERNS
— RETRACTED STATE

PCS BAND ANTENNA GAIN PATTERNS
— EXTENDED STATE

GPS BAND ANTENNA GAIN PATTERNS
- RETRACTED STATE

GPS BAND ANTENNA GAIN PATTERNS
– EXTENDED STATE

MOBILE COMMUNICATION SYSTEM HAVING MULTI-BAND ANTENNA

PRIORITY

This application claims priority to an application entitled "Mobile Communication System Having Multi-band Antenna" filed in the Korean Industrial Property Office on Oct. 13, 2001 and assigned Serial No. 2001-63239, the contents of which are hereby incorporated by reference.

BACKGROUND OF THE INVENTION

1. Field of the Invention

The present invention relates to a mobile communication system, and more particularly to a mobile communication system having a multi-band antenna, which may be employed in a portable mobile communication system and allows the communication to be smoothly carried out in different frequency bands.

2. Description of the Related Art

Mobile communication systems have made surprising commercial progress not only in Korea but also in the world. All over the world, one important step in the progress of mobile communication systems is the change from analog transmission to digital transmission. On the basis of digital transmission, mobile communication systems having dual operation modes, that is, which can be operated in either CDMA or PCS mode, are now being developed as private portable mobile communication systems.

Further, according to the regulation E911 of the Federal Communication Commission (FCC) it is anticipated that future mobile communications in the United States should provide a global positioning function. E911 of FCC recommends that mobile communication terminals should be able to transmit their location, that is, should be traced by a wireless positioning system, for example, by a global positioning system (GPS) satellite. Therefore, mobile communication terminals will be required to have an antenna capable of receiving the signal of GPS band, which is 1.575 GHz.

In general, a mobile communication terminal capable of receiving the GPS signal employs a chip-type GPS antenna, which will be described in detail hereinafter.

FIG. 1 is a schematic view including a block diagram of a conventional mobile communication system capable of receiving signals of triple bands. FIG. 1 shows the construction of a mobile communication terminal 10 for performing communication by receiving either a signal of the GPS band or other signals of other bands. The mobile communication terminal 10 has two antennas which selectively receive signals of bands different from each other.

That is, in the mobile communication terminal 10, signals with frequencies of CDMA and PCS bands are synchronized and received by a dual band antenna 12, while a signal with a frequency of the GPS band is synchronized and received by a GPS antenna 30. "Dual Band Antenna for Wireless Transmitter/receiver" disclosed in Korean Patent Laid-Open No. 1999-0072602 and U.S. Pat. No. 6,198,440 B1 issued to Samsung Electronics, Co., Ltd., the contents of which are incorporated by reference, describes an antenna that may be utilized as the dual band antenna 12, while a GPS band antenna realized as a chip may be utilized as the GPS antenna 30.

A signal with a frequency of the CDMA/PCS bands received by the dual band antenna 12 is supplied to a separator 50 through a matching circuit 40, which matches impedance between the dual band antenna 12, and a circuit in the mobile communication system. The separator 50 separates the signal with frequencies of CDMA/PCS bands received through the dual band antenna 12 into a signal with a frequency of CDMA band and a signal with a frequency of PCS band, and supplies the separated signals to a CDMA duplexer 60 and a PCS duplexer 70, which are connected with output terminals. In addition, the separator 50 supplies a signal received from the CDMA duplexer 60 or the PCS duplexer 70 to the dual band antenna 12 through the matching circuit 40.

FIGS. 2 and 3 are Smith charts that illustrate impedance matching characteristics of the dual band antenna 12 at the CDMA/PCS bands when it is in retracted and extended states in free space, obtained from measurements by means of a mobile communication phone model SCH-8500, which is produced and sold by Samsung Electronics, Co., Ltd., in which the dual band antenna 12 having the same construction as that in the disclosed in U.S. Pat. No. 6,198,440 is employed. In this case, the impedance was measured at connection nodes between the separator 50 and the CDMA/PCS duplexers 60 and 70. The impedance matching characteristics is measured by using a Network Analyzer 8753E manufactured by Agilent company. A vertical axis in graph of FIGS. 2 and 3 indicates Voltage Standing Wave Ratio (VSWR) where a bottom value is 1 and its value is increased upward by one per each division in the graph. And, a horizontal axis in graph of FIGS. 2 and 3 indicates Frequency. Also, in graph of the FIGS., frequency and VSWR as to the points 1 to 5 indicated as Δ are mentioned on right side and top part, respectively. For example, in FIG. 2, the frequency of Δ 1 is 824 MHz and the VSWR of Δ 1 is 1.5399. The above are applicable identically to the other figures showing impedance matching characteristics in this application. Further, FIGS. 5 to 8 illustrate antenna gain patterns at the CDMA/PCS bands in free space, obtained from measurements for the dual band antenna 12 employed in the above mobile phone model.

The two duplexers 60 and 70 each supply the CDMA and PCS band frequencies separately outputted from the separator 50 to CDMA RF section 110 comprising communication signal processing section and PCS RF section 120, and also supplies the RF signal outputted from the CDMA RF section 10 and PCS RF section 120 to the separator 50. The CDMA RF section 110 modulates the signal received from the CDMA duplexer 60 and supplies the modulated signal to the controller 90, or modulates a signal to be transmitted that is inputted from the controller 90 and supplies the modulated signal to separator 50. The PCS RF section 120 modulates the signal received from the PCS duplexer 70 and supplies it to the controller 90, or modulates the signal to be transmitted that is inputted from the controller 90 to a signal of a PCS band and supplies it to the separator 50.

The controller 90 has the functions of a control section in a general dual mode mobile communication system such as a mobile phone usable as either a CDMA or a PCS mobile phone. Therefore, the controller 90 either reproduces the voice from a signal received from the CDMA RF section 110 or the PCS, or supplies the voice signal to the CDMA RF section 110 or the PCS RF section 120.

Meanwhile, a GPS filter 80 connected with the GPS antenna 30 filters signals received thereto and passes only the GPS band signal, thereby supplying it to a GPS signal processing unit 100 in controller 90. The GPS signal processor 100 demodulates a signal of GPS band inputted thereto, thereby generating three-dimensional information for global positioning.

FIGS. 4 and 9 illustrate impedance matching data at the GPS band in free space state and an antenna gain pattern in a retracted state, obtained from measurements by means of the GPS antenna 30 employed in the above mobile communication phone model SCH-8500.

However, the conventional mobile communication system having the construction as shown in FIG. 1 is disadvantageous in that it has a separate GPS antenna 30 for receiving the signal of GPS band, which makes the construction of the system complicated.

SUMMARY OF THE INVENTION

Accordingly, the present invention has been made to solve the above-mentioned problems occurring in the prior art, and an object of the present invention is to provide a mobile communication system which has an antenna construction capable of smoothly receiving frequencies of three bands which are different from each other.

It is another object of the present invention to provide a mobile communication system which employs an integrated antenna having a dual helical construction capable of receiving frequencies of either the CDMA/PCS bands or the GPS band with a minimum of loss.

It is still another object of the present invention to provide a mobile communication system which may have either a fixed type antenna employing a dual-pitch helical antenna or a retractable type antenna employing a dual-pitch helical antenna along with a whip antenna, and which can effectively receive signals of different frequency bands by means of a switch element capable of effectively operating for multi-band signals and separating triple band signals from each other.

In order to accomplish these objects, there is provided a mobile communication system having a multi-band antenna, comprising: a GPS processing section for receiving a signal of a first frequency band, so as to generate global positioning information; a communication signal processing section for receiving signals of a second frequency band and a third frequency band, demodulating the received signals, and modulating signals to be transmitted of the second frequency band and the third frequency band and outputting the modulated signals, the second frequency band being lower than the first frequency band and the third frequency band being higher than the first frequency band; a multi-band antenna for receiving and transmitting signals of multiple frequency bands including the first to third frequency bands, the multi-band antenna including a dual-pitch helical antenna which includes first and second helical coil portions connected in series, the first and second helical coil portions having pitches different from each other so that the first and second helical coil portions have different impedances for the signals of the first to third frequency bands; a frequency band separator section connected between the multi-band antenna and the GPS processing section and communication signal processing section, the frequency band separator section supplying the signal of the first frequency band to the GPS processing section while supplying the signals of the second and third frequency bands to the communication signal processing section, among the signals of multiple frequency bands received by the multi-band antenna, the frequency band separator section supplying signals, which are outputted from the GPS processing section and the communication signal processing section to the multi-band antenna; and a control section for controlling the GPS processing section and the communication signal processing section.

It is preferred that the multi-band antenna is a retractable type antenna employing a dual-pitch helical antenna along with a whip antenna. Also, it is preferred that the multi-band antenna is a triple-band antenna capable of receiving signals of not only dual bands of CDMA/PCS but also a GPS band.

The frequency band separator section comprises: a switch for forming an electric wave path between the multi-band antenna and the communication signal processing section, the switch changing the electric wave path by connecting an electric wave path of the multi-band antenna to the GPS processing section in response to a path control signal outputted from the control section; a separator disposed between and connected to the switch and the communication signal processing section, the separator separating and outputting signals of the second and third frequency bands, and supplying signals of the second and third frequency bands to the switch; and a CDMA duplexer and a PCS duplexer for supplying the signals of the second and third frequency bands outputted from the separator to CDMA and PCS RF sections in the communication signal processing section, respectively, and for supplying signals of the second and third frequency bands, outputted from the CDMA and PCS RF sections, to the separator, respectively.

The control section sends the path control signal to the switch for a predetermined period of time in response to an E911 mode, and controls the GPS processing section and the communication signal processing section.

In accordance with another aspect of the present invention, the frequency band separator section may comprise: a duplexer for separating signals received from the multi-band antenna into a signal of the second frequency band and signals of a frequency band higher than the second frequency band, the diplexer supplying the signal of the second frequency band to a CDMA RF section in the communication signal processing section; a separator for separating the signals of the frequency band higher than the second frequency band into the signals of the first and third frequency bands, supplying the signal of the first frequency band to the GPS processing section, and supplying inputted signals of the first and third frequency bands to the diplexer; CDMA duplexer for supplying the signal of the second frequency band to CDMA RF section in the communication signal processing section; and a PCS duplexer for supplying the signal of the third frequency band to a PCS RF section in the communication signal processing section.

In the mobile communication system having either construction described above according to the present invention, the number of turns and pitches of each coil portion of the dual-pitch helical coil can be properly selected so as to realize a multi-band antenna capable of having at least two resonance frequency bands. Further, in the mobile communication system, the frequency band separator section separates low frequency band signals such as CDMA/PCS communication signals, GPS signal, or CDMA signal, as well as high frequency band signals such as GPS/PCS signals, from each other, thereby enabling the mobile communication system to perform the E911 mode service in addition to the dual band (CDMA/PCS) communication services. Furthermore, the present invention realizes a more compact mobile communication system capable of receiving signals of various frequency bands different from each other through one antenna.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, mobile communication systems having a multi-band antenna according to preferred embodiments of the present invention will be described with reference to the accompanying drawings. The following description omits known functions and configurations to avoid making the subject matter of the present invention unclear.

Figure 10:
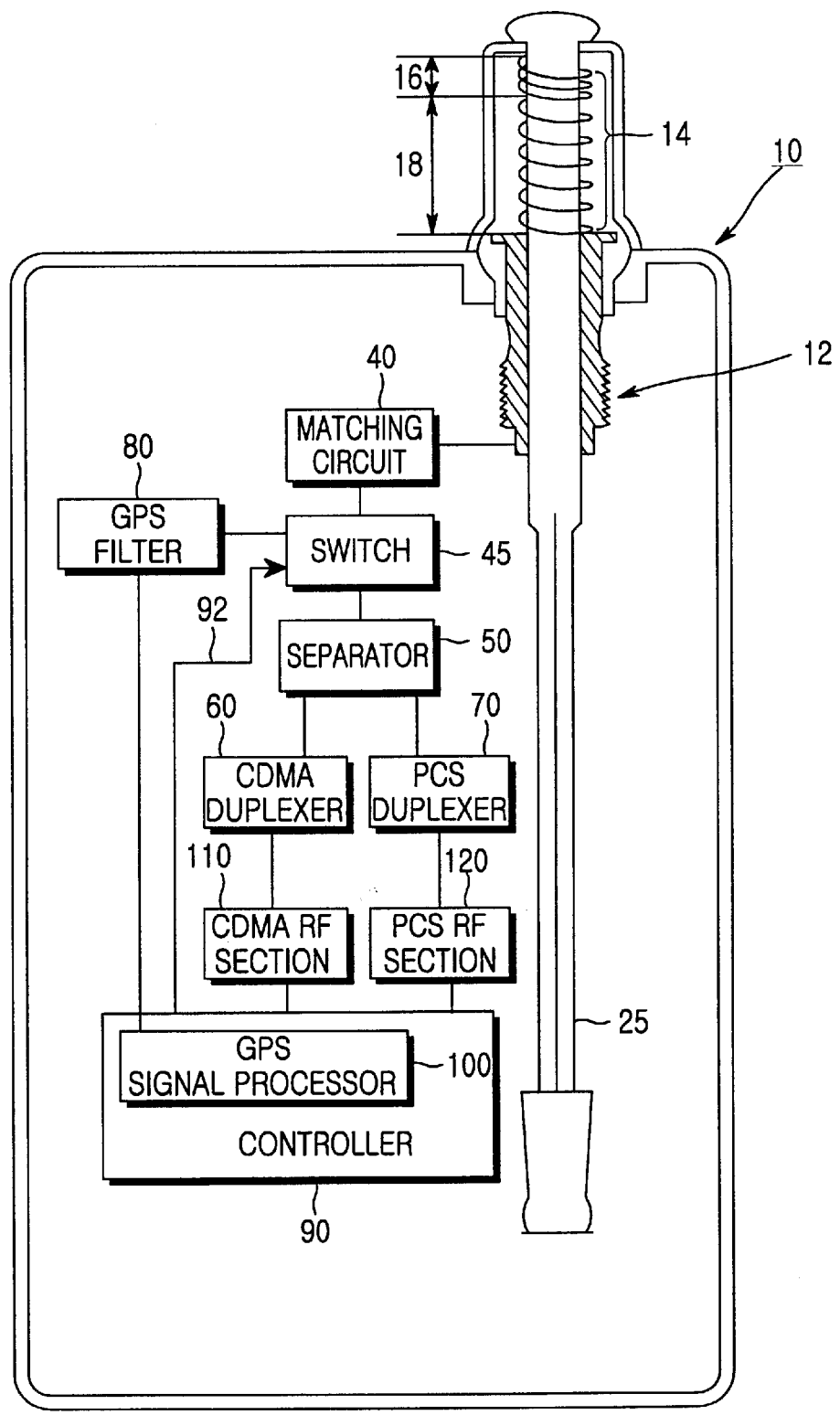
FIG. 10 is a schematic view including a block diagram, which illustrates a construction of a mobile communication system having a multi-band antenna according to the first embodiment of the present invention.

FIG. 10 is a schematic view containing a block diagram, which illustrates a construction of a mobile communication system having a multi-band antenna according to the first embodiment of the present invention. Referring to FIG. 10, a multi-band antenna 12 is assembled with a housing of a mobile communication terminal 10. Further, the multi-band antenna 12 is connected to a matching circuit 40 which is connected to an electric wave path switch (hereinafter, referred to as "switch") of a frequency band separator/synthesizer section. The frequency band separator comprises the switch 45, the separator 50, the CDMA duplexer 60, and the PCS duplexer 70.

The multi-band antenna 12 shown in FIG. 10 may be realized either as a fixed type antenna in which a dual-pitch helical antenna 14 is used alone, or as a retractable type antenna in which the dual-pitch helical antenna 14 is used along with a whip antenna 25. In the present embodiment, only the retractable type antenna is shown.

In the multi-band antenna 12 shown in FIG. 10, the length of the whip antenna 25, and the number of turns and pitches of first and second helical coil portions, 16 and 18, which constitute the dual-pitch helical antenna 14, may be properly selected, so as to enable the multi-band antenna 12 to operate in three different frequency bands. In the shown construction of the dual pitch helical antenna 14, the first coil portion 16 at the upper location thereof has a small pitch, while the second coil portion 18 at the lower location thereof has a large pitch. The first coil portion 16 has a very large impedance either at a first frequency band which is the GPS band of 1.575 GHz or at a third frequency band which is the PCS band of 1.7 to 2.0 GHz higher than the first band, when the pitch of the first coil portion 16 is properly reduced. In this case, electric current cannot flow through the first coil portion 16, so that only the second coil portion 18 can function as an antenna in the high frequency bands.

However, in a lower frequency band such as a second frequency band between 800 MHz and 900 MHz, the impedance of the first coil portion 16 is not so large, so that both the first and second coil portions 16 and 18 function as the helical antenna. That is, in the second frequency band, not only the second coil portion 18 having a large pitch but also the first coil portion 16 having a small pitch functions as an antenna. By properly determining the number of turns and pitches of the first and second coil portions constitute the dual-pitch helical antenna 14, two desired resonance frequency bands can be obtained. In this case, by properly increasing the pitch of the second coil portion 18, a broad resonance frequency band of 1.5 to 2.0 GHz can be obtained. That is, the multi-band antenna 12 realized in this way can be operated in three frequency bands, that is, CDMA band of 800 to 900 MHz, GPS band of 1.575 GHz, and PCS band of 1.7 to 2.0 GHz.

The broad band signals received by the multi-band antenna 12 are supplied to a switch 45 through the matching circuit 40. The switch 45 is a two-way switch and is an active switch which either connects the matching circuit 40 with the separator/synthesizer unit 50 or selectively switches on and off the connection between the matching circuit 40 and a GPS filter 80, in response to the input of the path control signal 92.

In a normal mode, the path control signal 92 is provided by the controller 90, so as to connect the matching circuit 40 and the separator 50 with each other. Therefore, in the normal mode, a broad band signal, the impedance of which has been matched by the matching circuit 40, is supplied to the separator/synthesizer unit 50, which separates the broad band signal into a signal of the second frequency band and a signal of another frequency band higher than the first frequency band, which are then supplied to the CDMA duplexer 60 and the PCS duplexer 70, respectively.

Like a general duplexer, which separates transmission and reception signals from each other, each of the CDMA duplexer 60 and the PCS duplexer 70 separates transmission and reception signals between the separator 50 and the CDMA RF section 110 or the PCS RF section 120. Further, a dual mode mobile communication system having the construction as shown in FIG. 10, such as a cellular phone capable of being operated in either the CDMA or PCS modes, is operated after being set to only one of the dual modes. Therefore, in this case, in the dual mode mobile communication system having the construction as shown in FIG. 10, one of the CDMA and PCS modes may be selected by means of a controller 90 so as to receive and transmit voice/data, as is in a usual dual mode phone.

From the operation state as described above, when the E911 mode is set by a user, the electric wave path control signal 92 outputted from controller 90 undergoes a transition, for example, a transition from a logic "LOW" to a logic "HIGH". Then, the switch 45 connects the matching circuit 40 to the GPS filter 80 in response to the transition of the path control signal 92. The GPS filter 80 filters the signal of 1.57 GHz band, so as to supply only the first frequency band signal among the first to third frequency band signals to the GPS signal processor 100.

In this case, the GPS signal processor 100 receives the GPS band signal so as to supply global positioning information to the controller 90. Then, the controller 90 transmits the path control signal 92 again and transmits the global positioning information to an E911 center through the CDMA RF section 110 or the PCS RF section 120 according to the presently operated mode between the CDMA and PCS modes, thereby enabling the location of the mobile communication system to be reported. Through the above operation, the mobile communication system according to the present invention can perfectly perform not only in the CDMA or PCS modes but also in the E911 mode.

Figure 11:
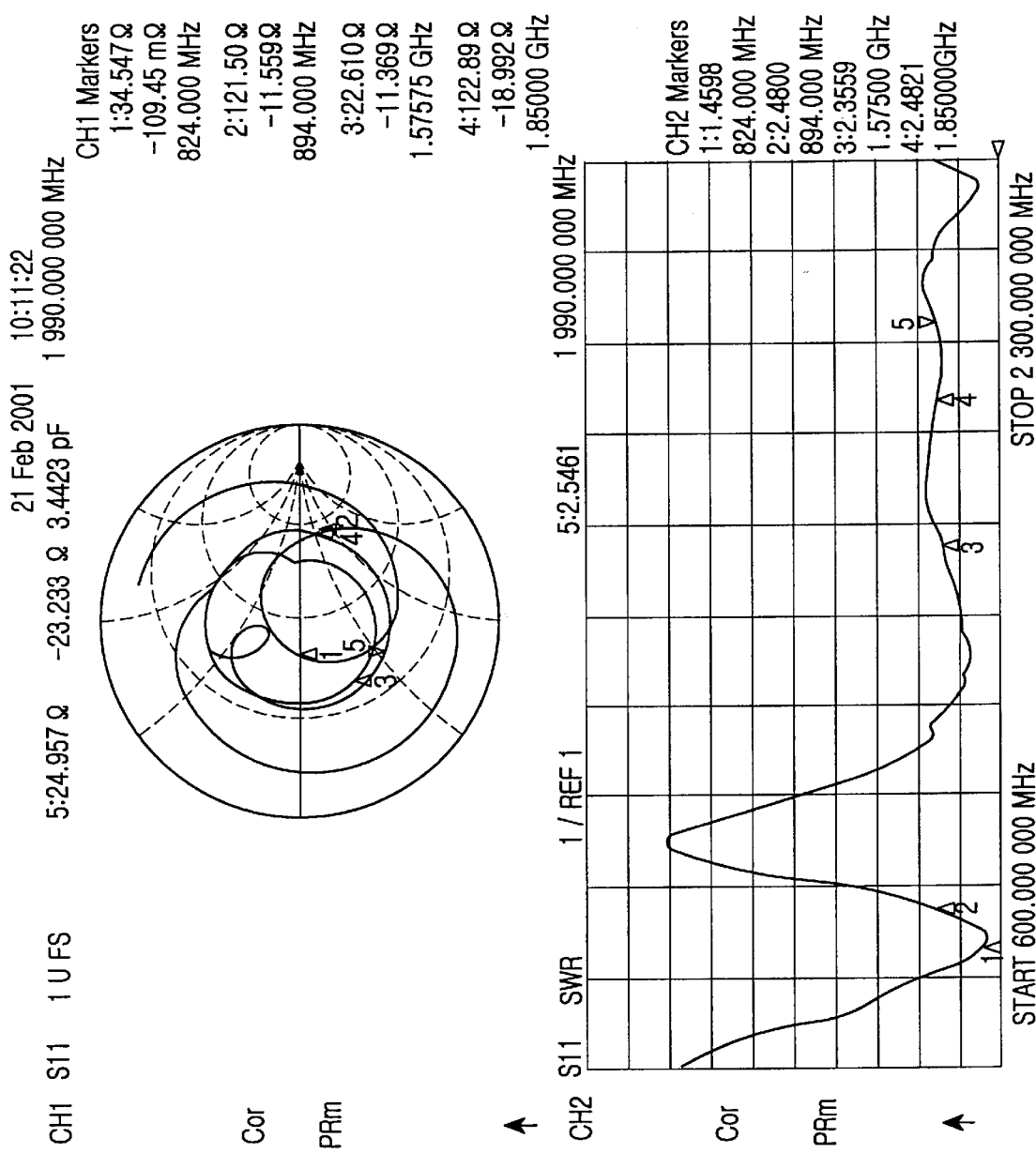
FIGS. 11 and 12 are Smith charts showing impedance matching characteristics of the multi-band antenna shown in FIG. 10, which is in retracted and extended states in free space.
Figure 12:
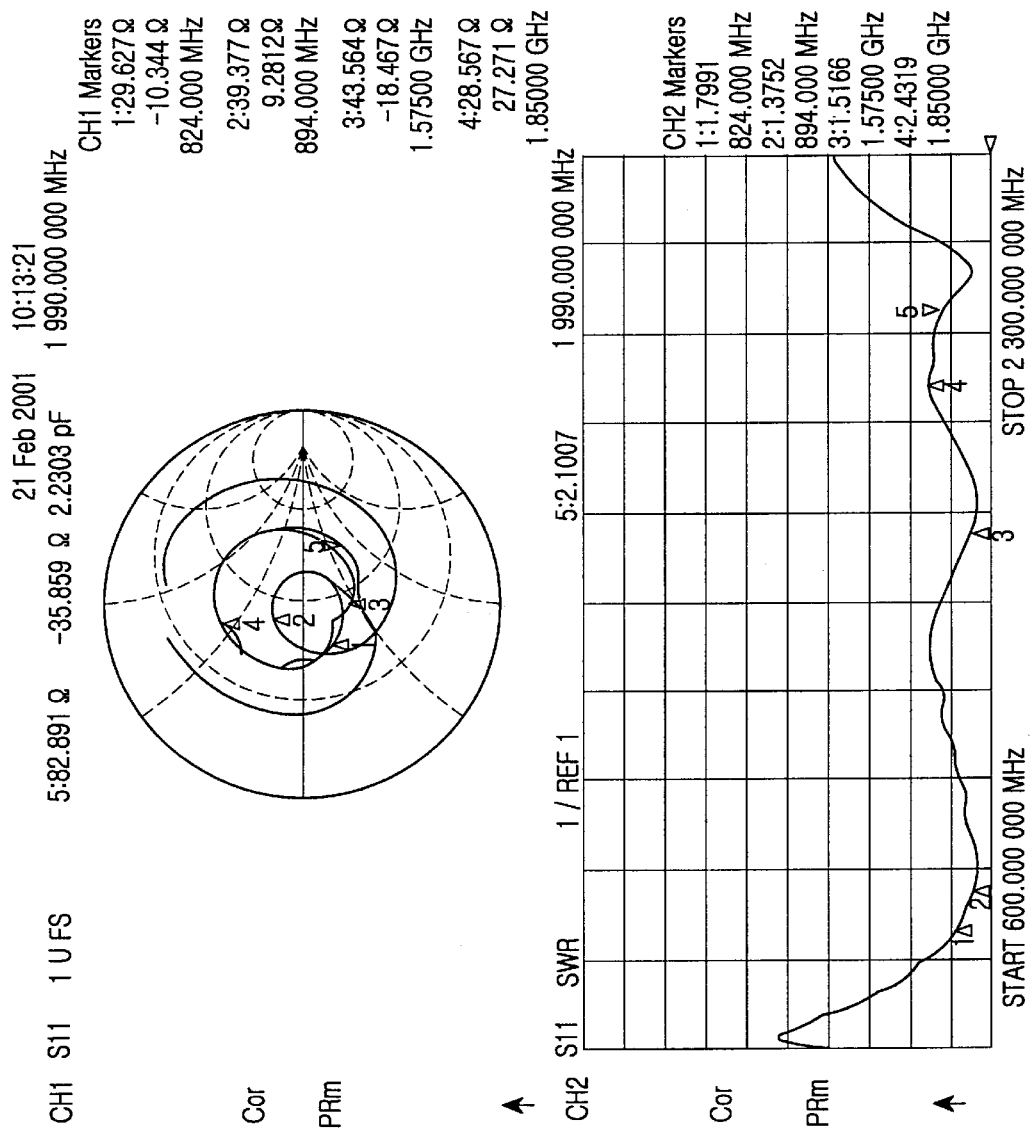

According to experiments utilizing a mobile phone model SCH-8500, produced and sold by the assignor of the present invention (i.e. Samsung Electronics, Co., Ltd.), employing the multi-band antenna 12 having the construction as described above, the impedance matching characteristics at the CDMA/PCS bands in free space do not show a large difference from the dual band antenna disclosed in U.S. Pat. No. 6,148,440, as shown in FIGS. 11 and 12.

Figure 1:
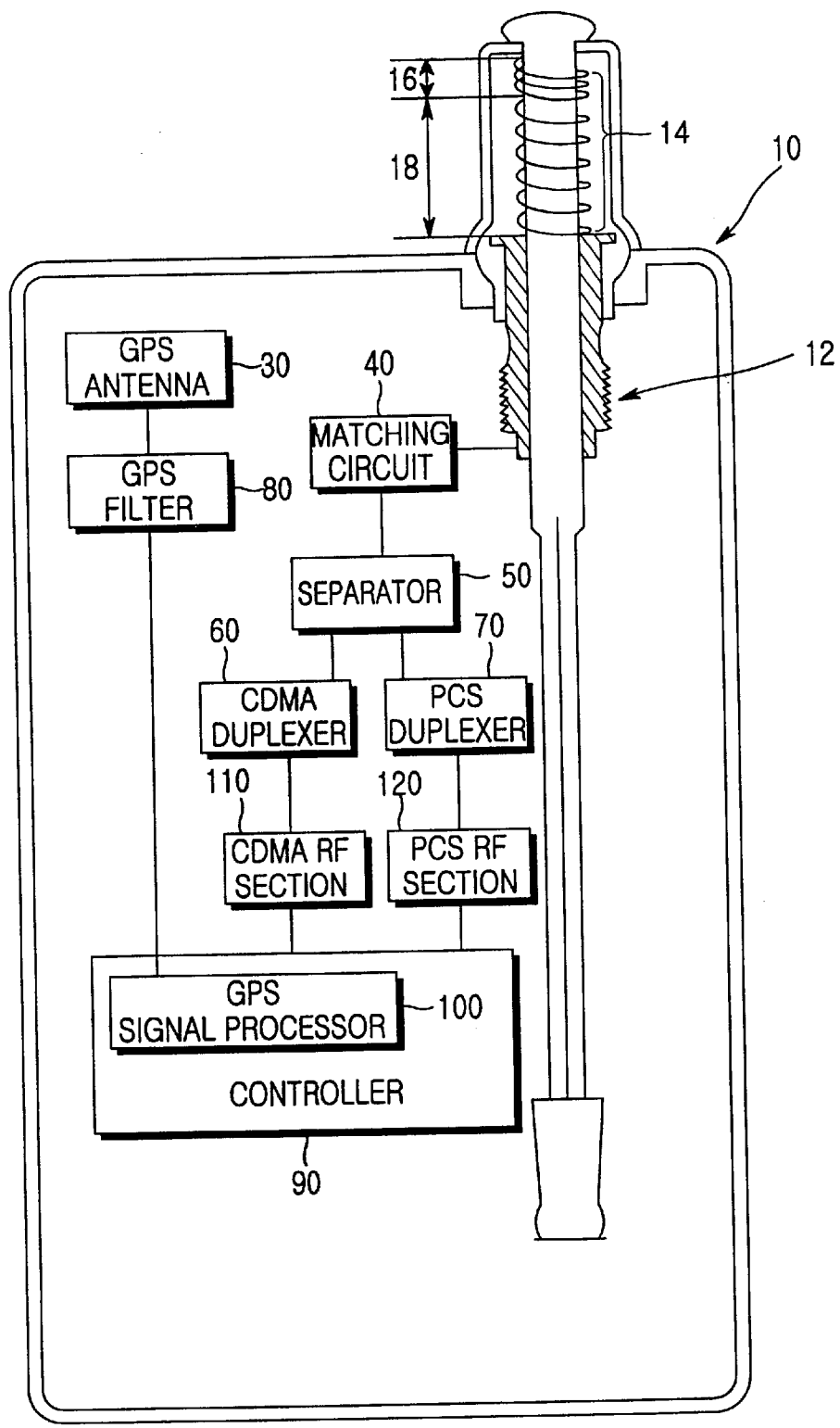
FIG. 1 is a schematic view including a block diagram of a conventional mobile communication system capable of receiving signals of triple bands.
Figure 2:
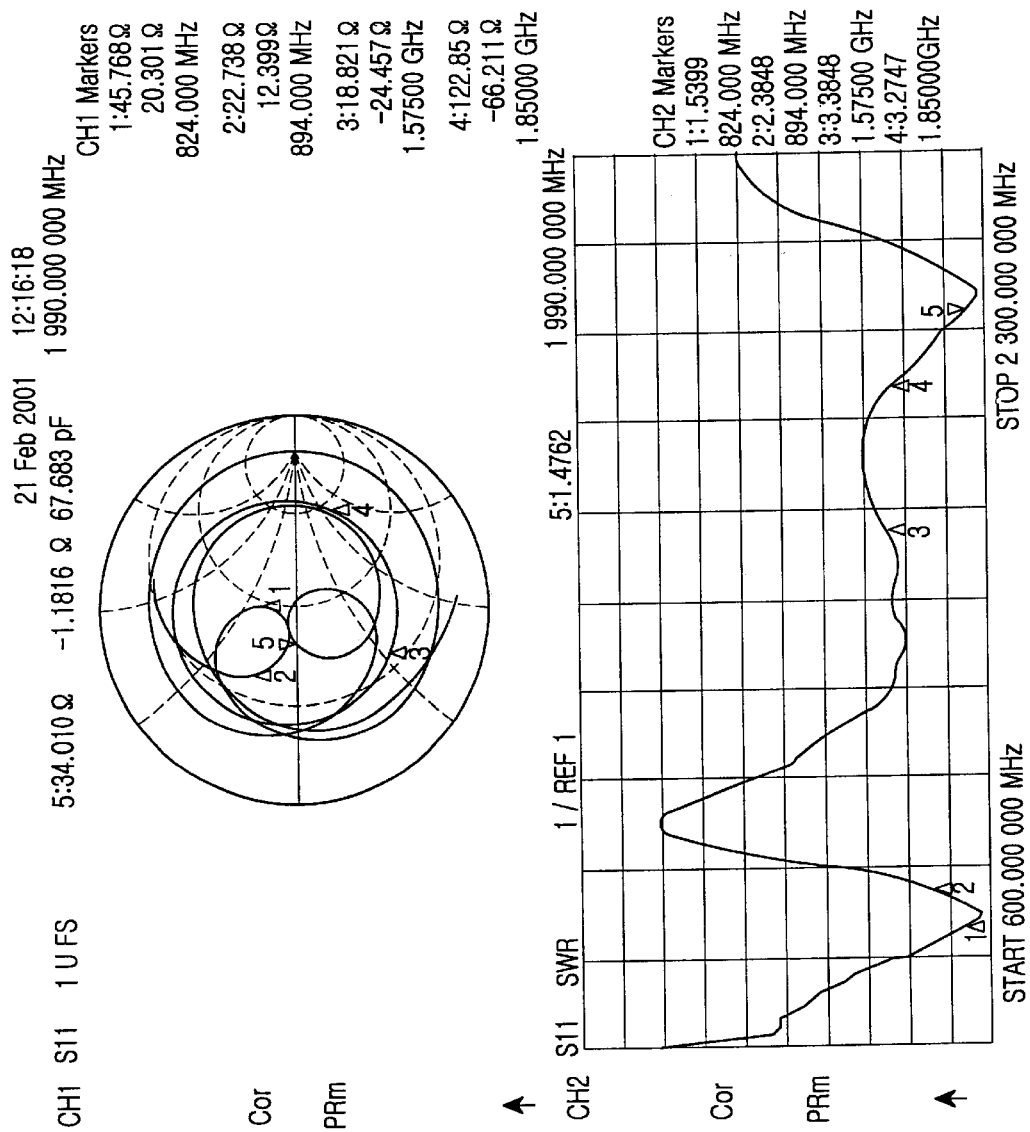
FIGS. 2 and 3 are Smith charts showing impedance matching characteristics of the dual band antenna shown in FIG. 1, which is in retracted and extended states in free space.
Figure 3:
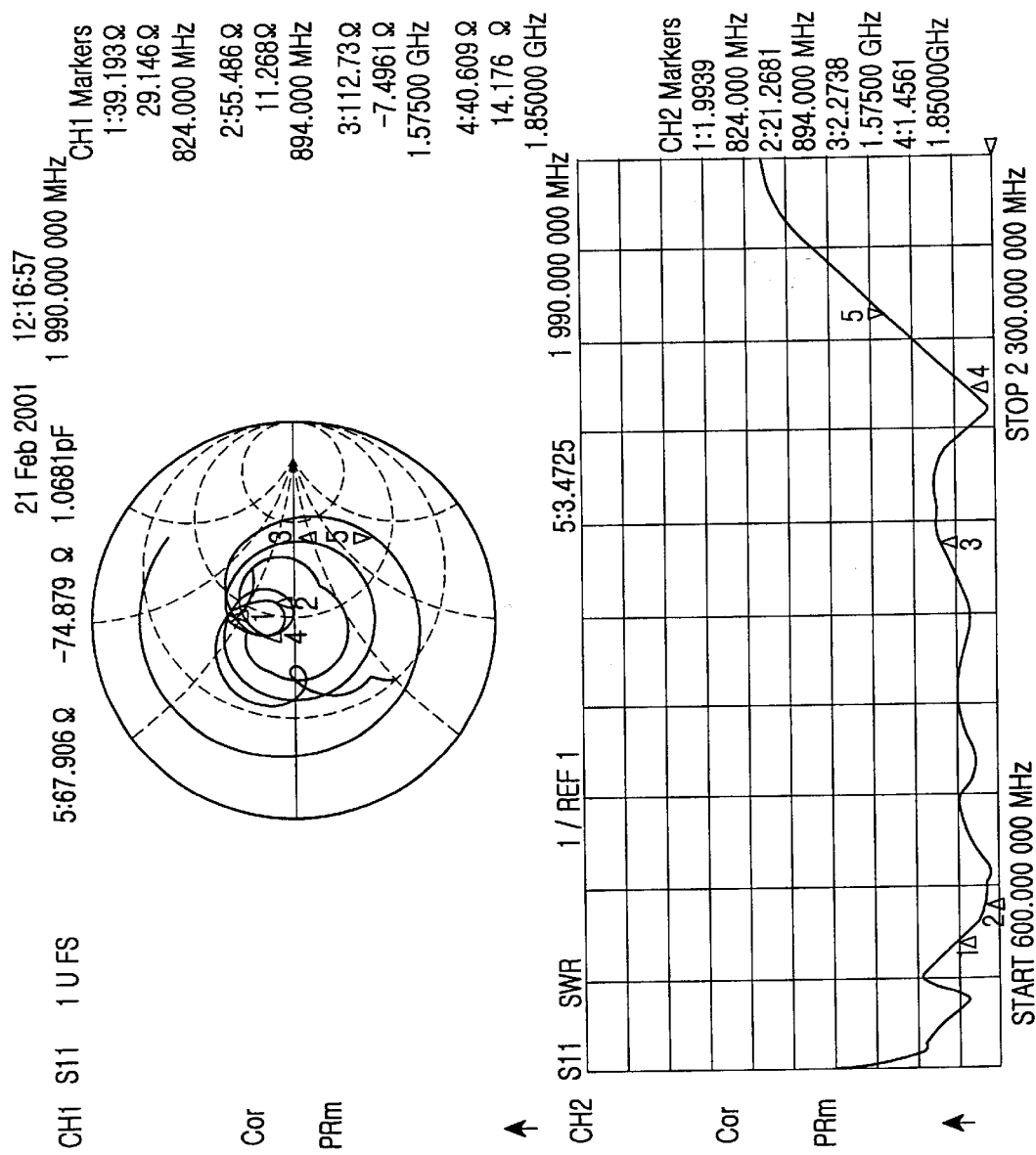
Figure 4:
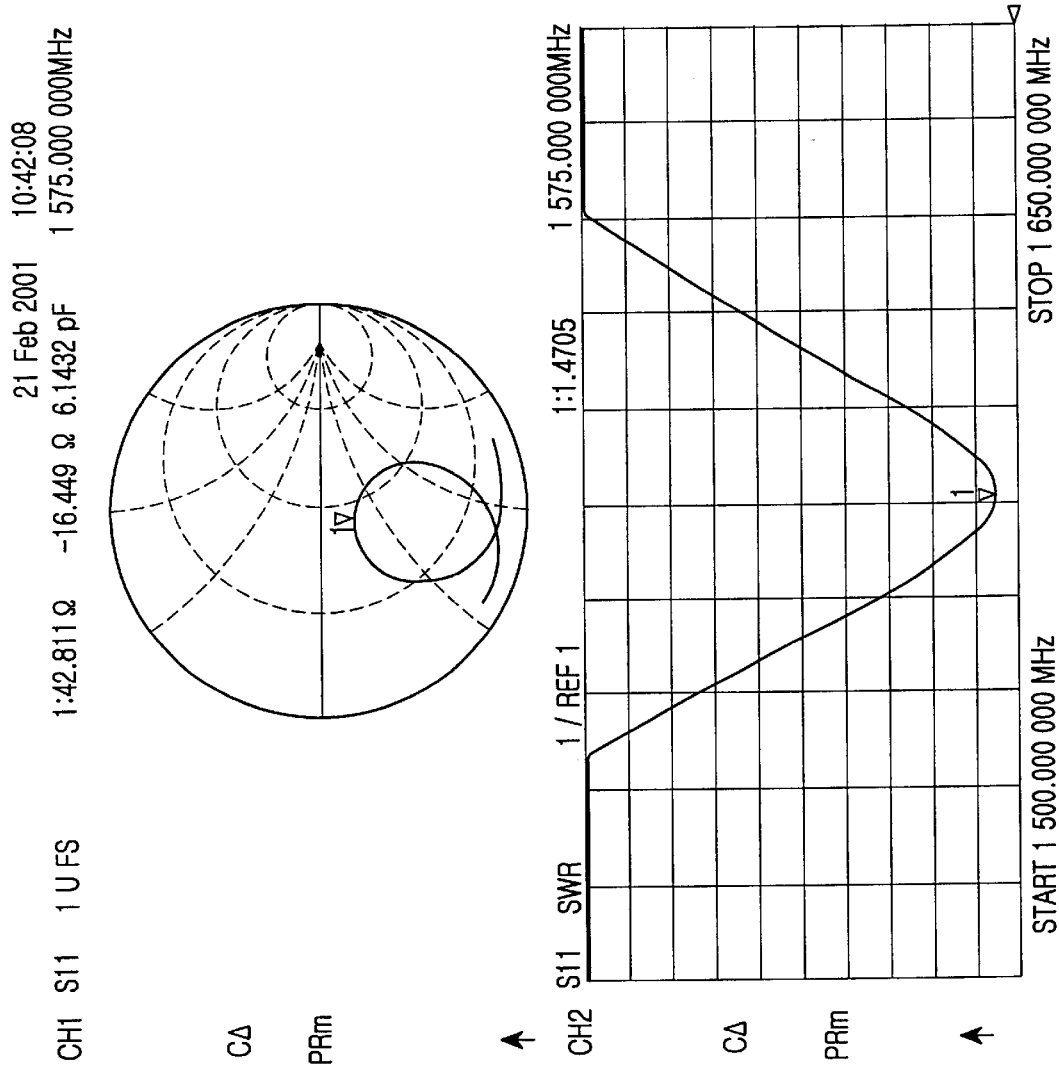
FIG. 4 is a Smith chart showing GPS band impedance matching characteristics of the GPS chip-type antenna shown in FIG. 1 in free space state.
Figure 5:
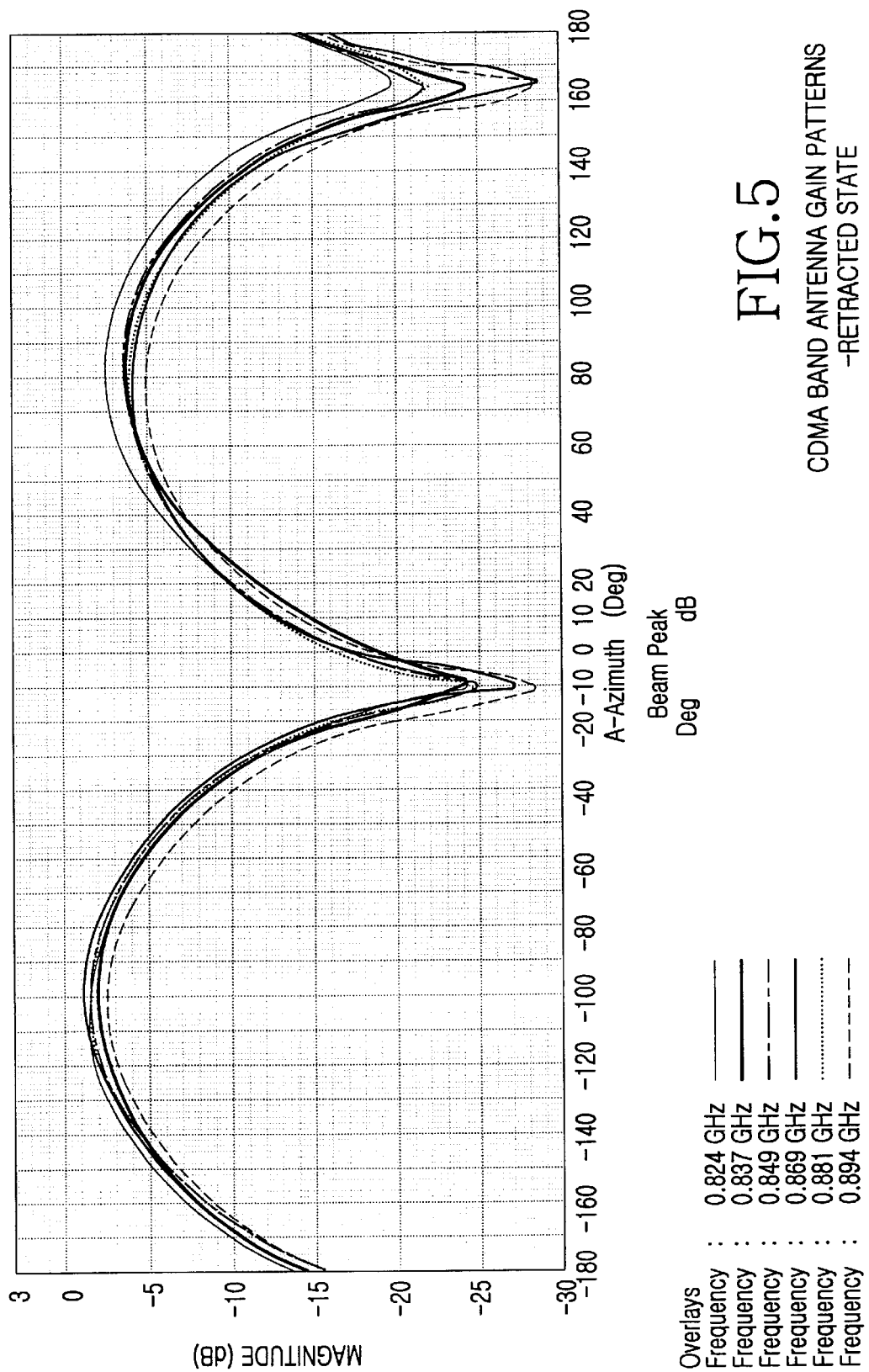
FIGS. 5 and 6 are diagrams showing CDMA band antenna gain patterns of the dual band antenna shown in FIG. 1, which is in retracted and extended states in free space.
Figure 6:
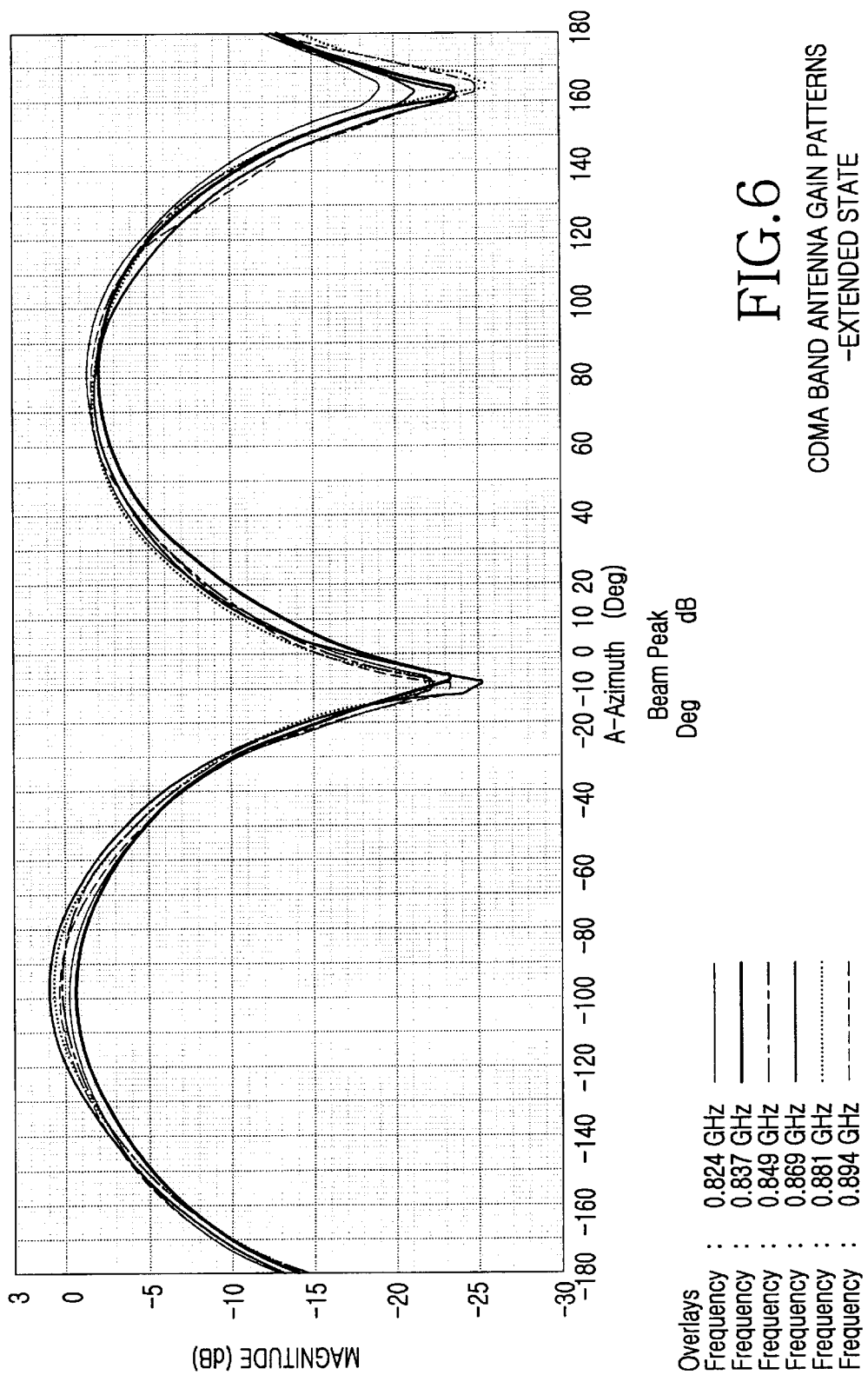
Figure 7:
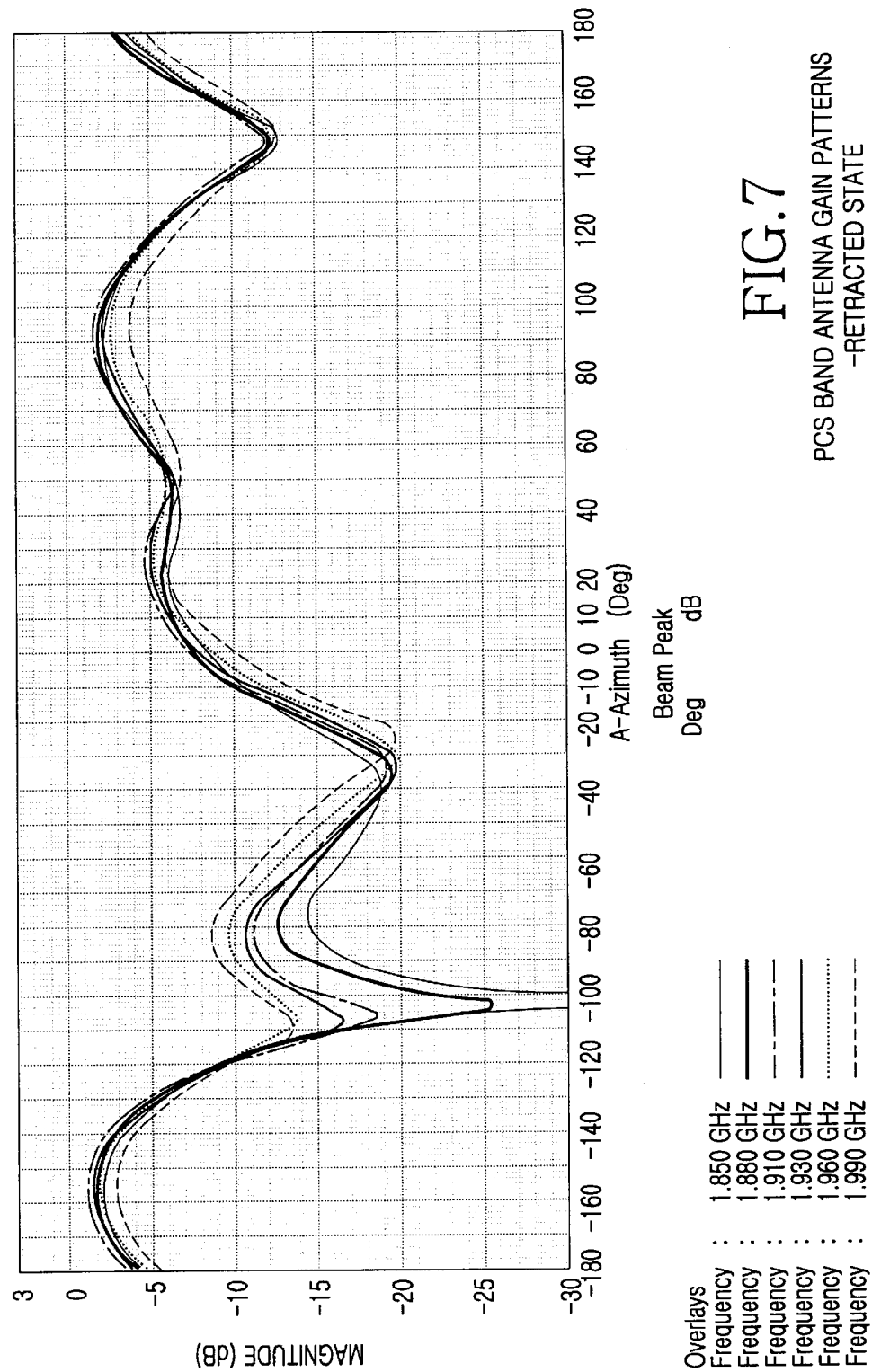
FIGS. 7 and 8 are diagrams showing antenna gain patterns, at the PCS band, of the dual band antenna shown in FIG. 1, which is in retracted and extended states in free space.
Figure 8:
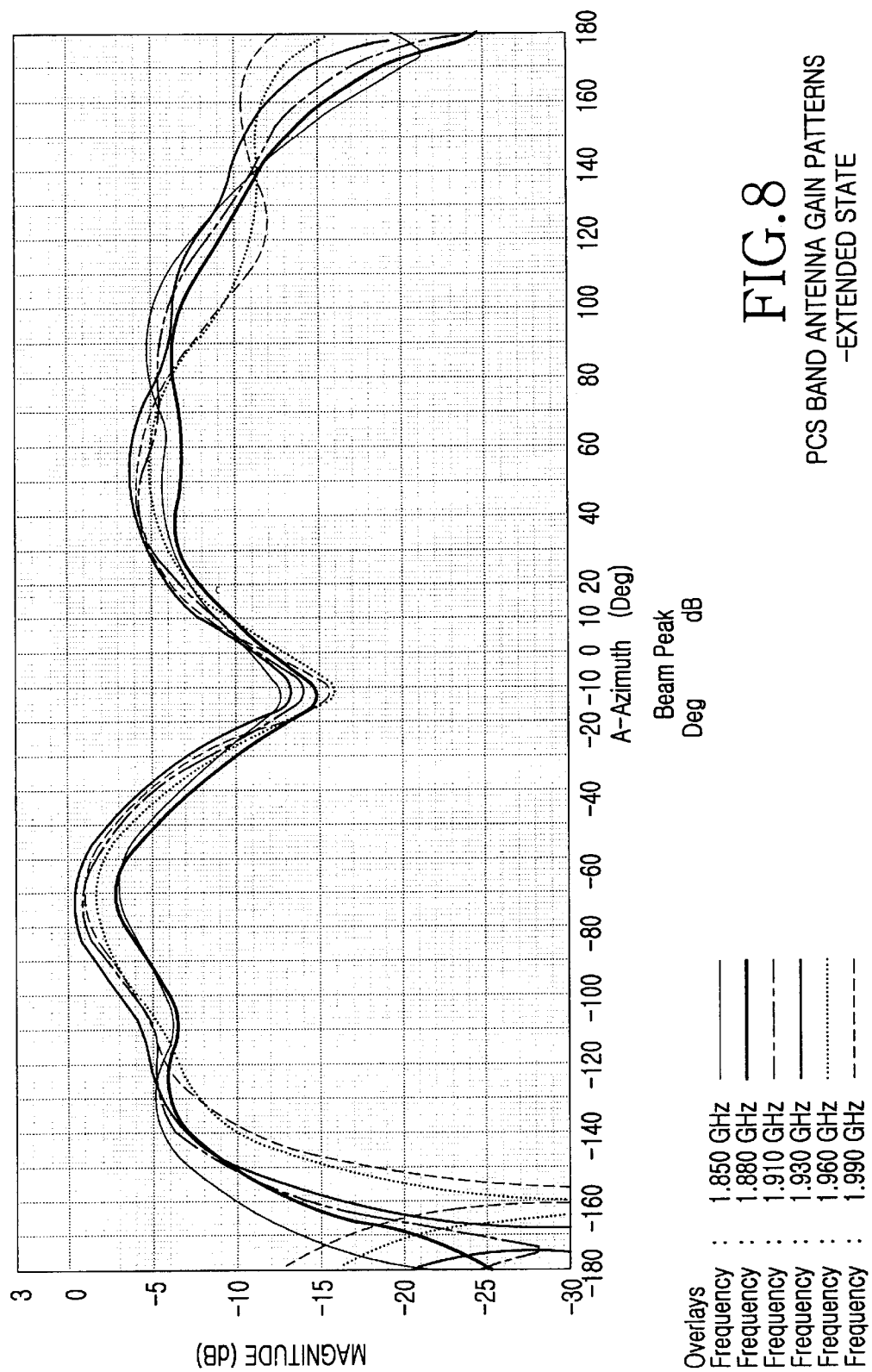
Figure 9:
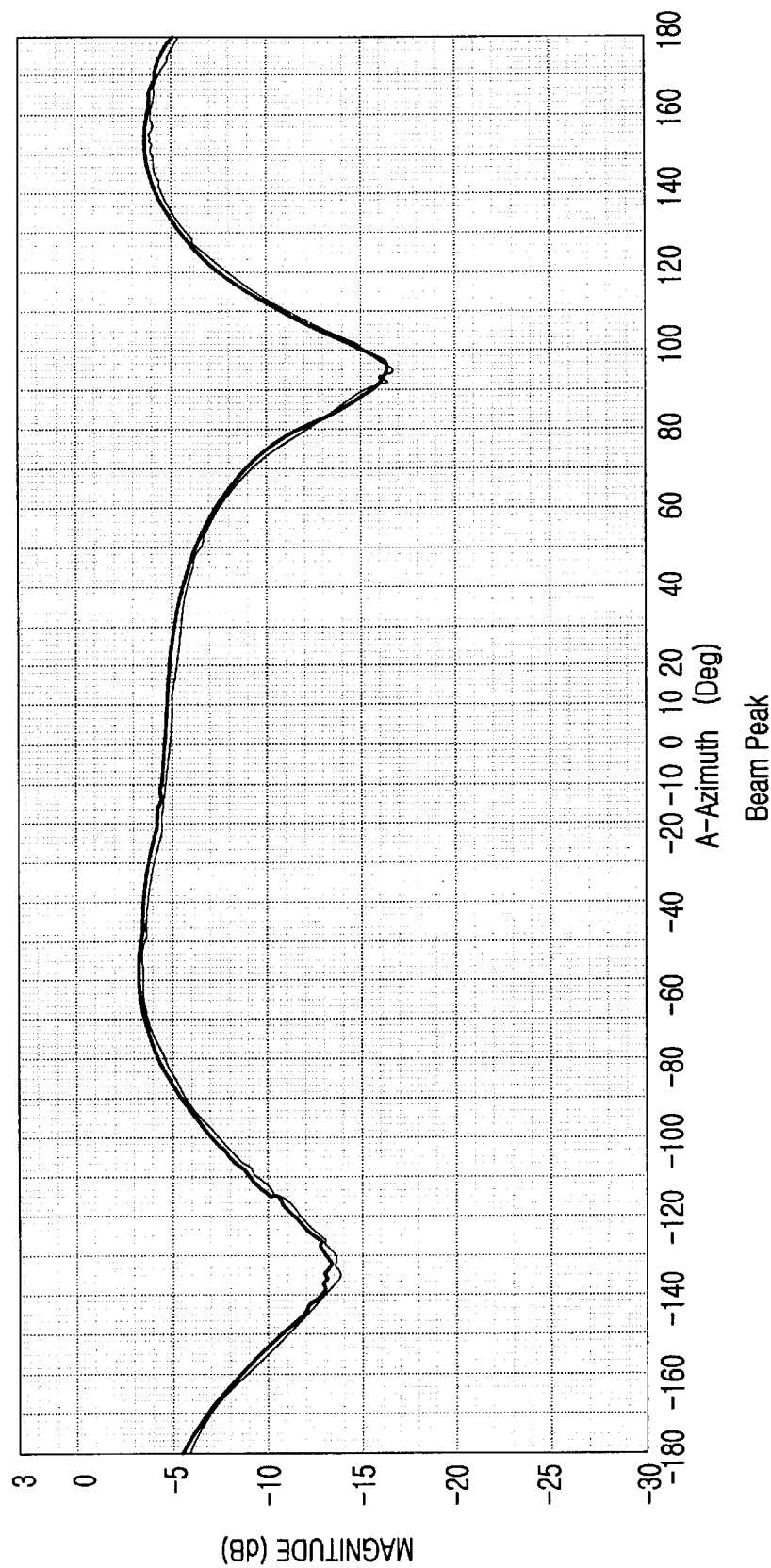
FIG. 9 is a diagram showing an antenna gain pattern, at the GPS band, of the GPS chip antenna shown in FIG. 1 in free space state.
Figure 13:
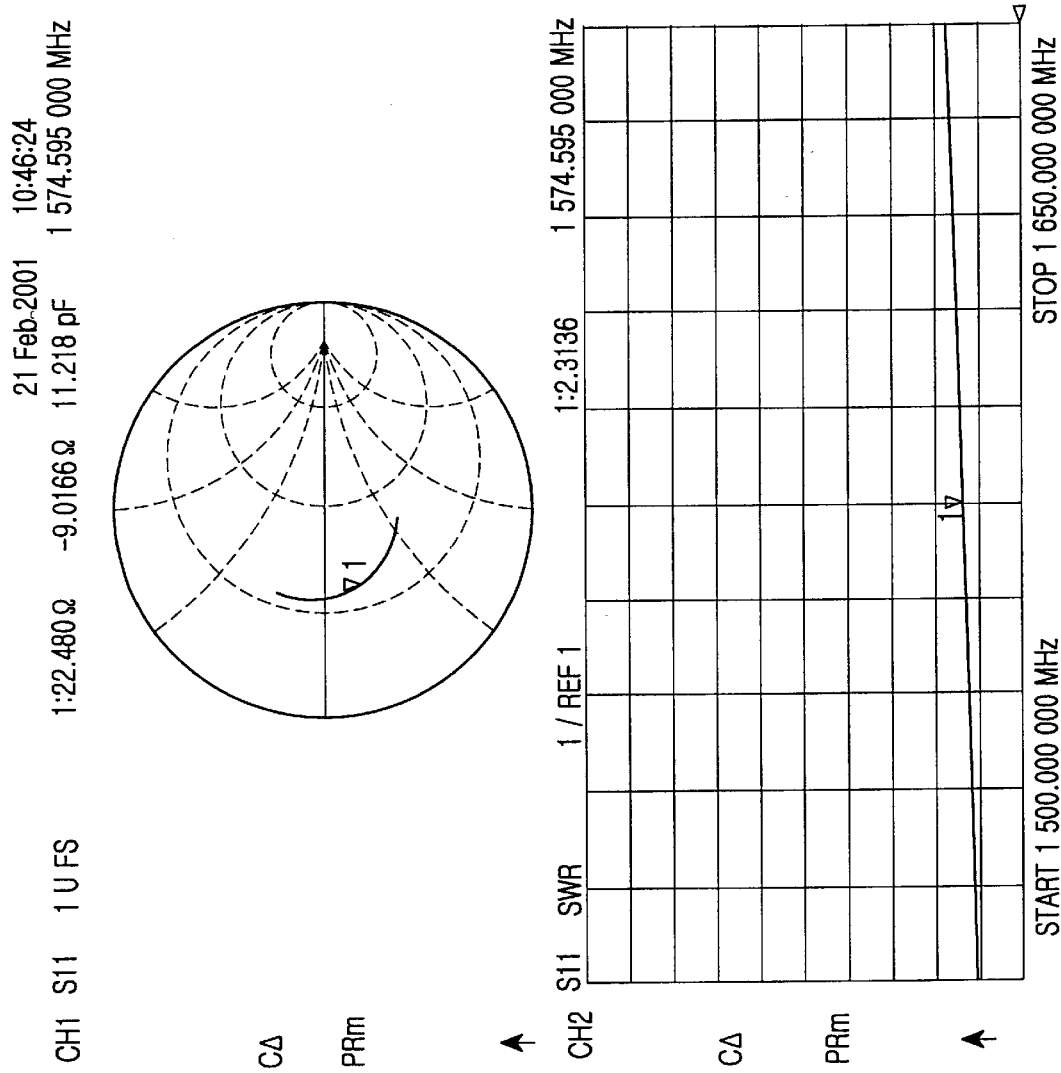
FIGS. 13 and 14 are Smith charts showing GPS band impedance matching characteristics of the multi-band antenna shown in FIG. 10, which is in retracted and extended states in free space.
Figure 14:
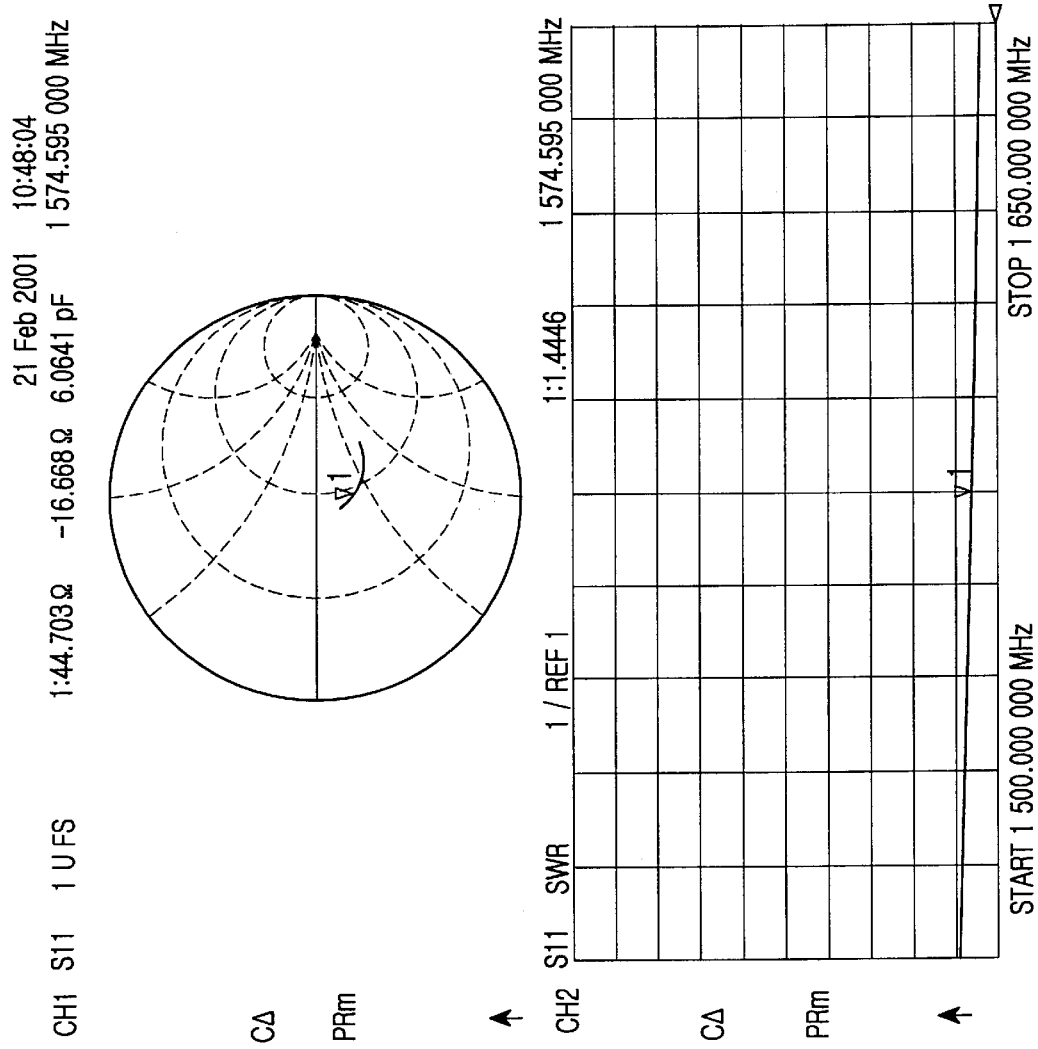

Further, the impedance matching characteristics in the GPS band in free space in the retracted and extended states also do not show a large difference from the GPS chip-type antenna of the related art, as can be easily understood by a comparison of FIGS. 13 and 14 with FIG. 4. Actually, the multi-band antenna according to the present invention has a VSWR not larger than 2.5, which is at least not inferior to that of the existing dual band antenna.

Figure 15:
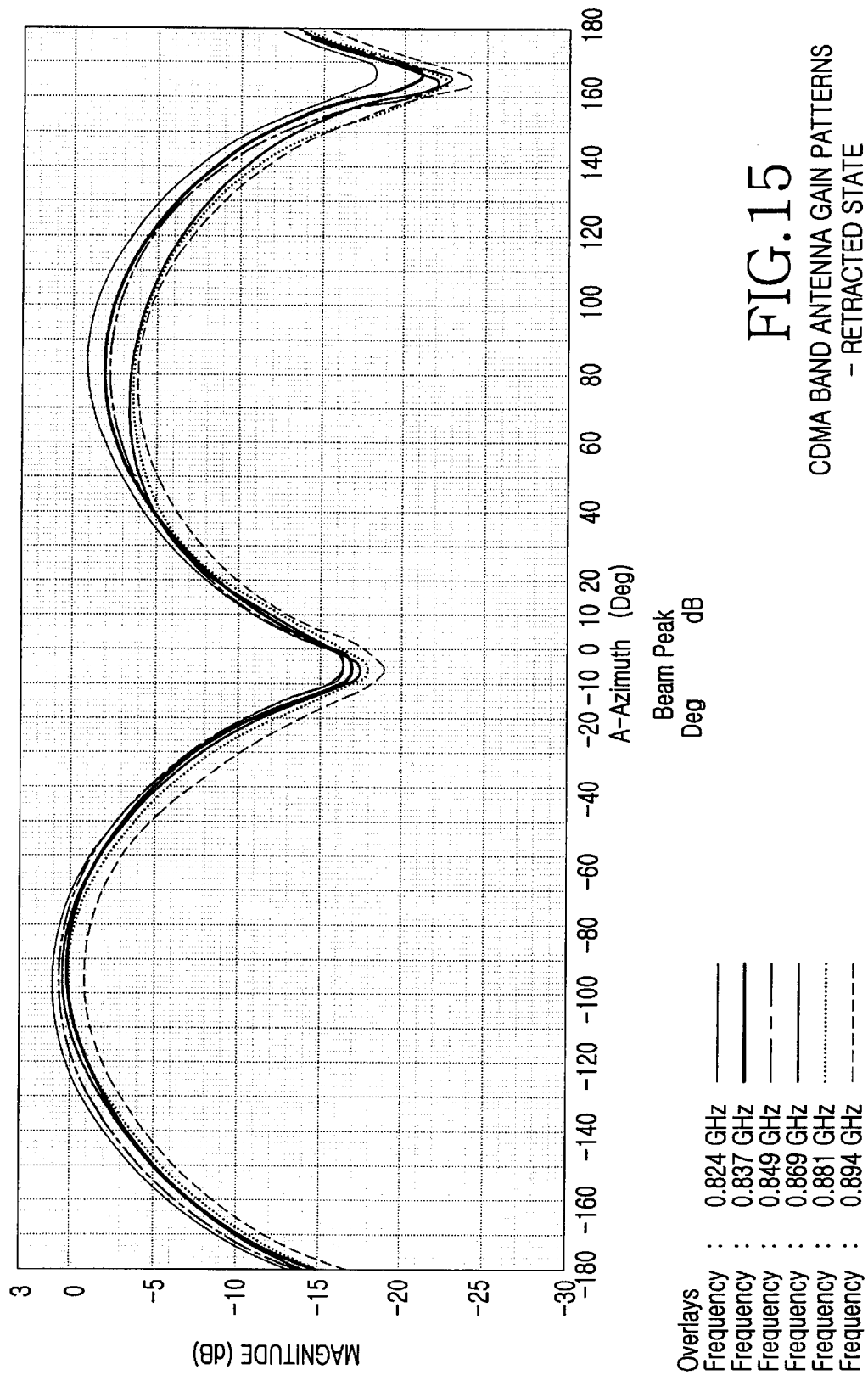
FIGS. 15 and 16 are diagrams showing CDMA band antenna gain patterns of the dual band antenna shown in FIG. 10, which is in retracted and extended states in free space.
Figure 16:
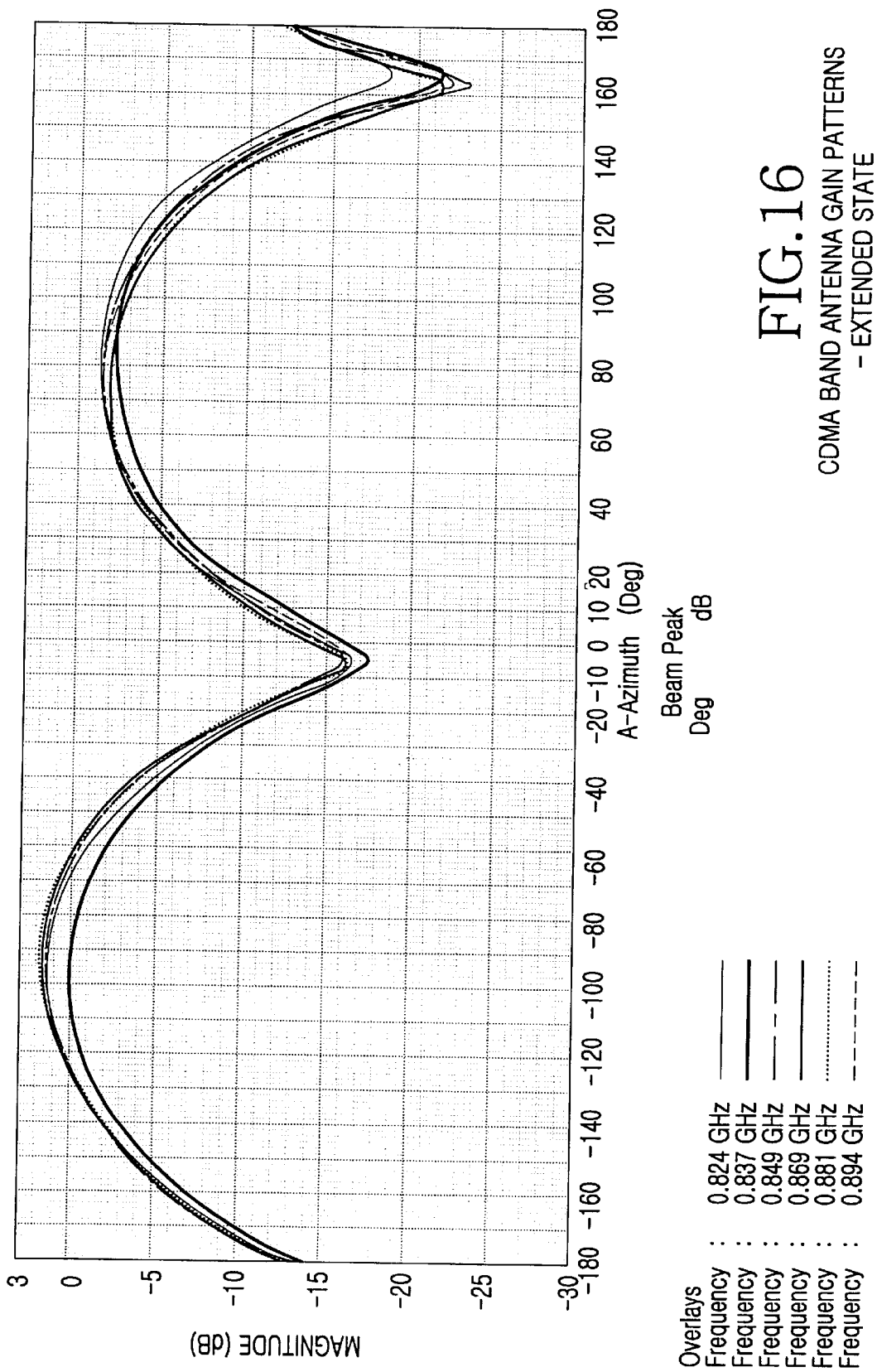
Figure 17:
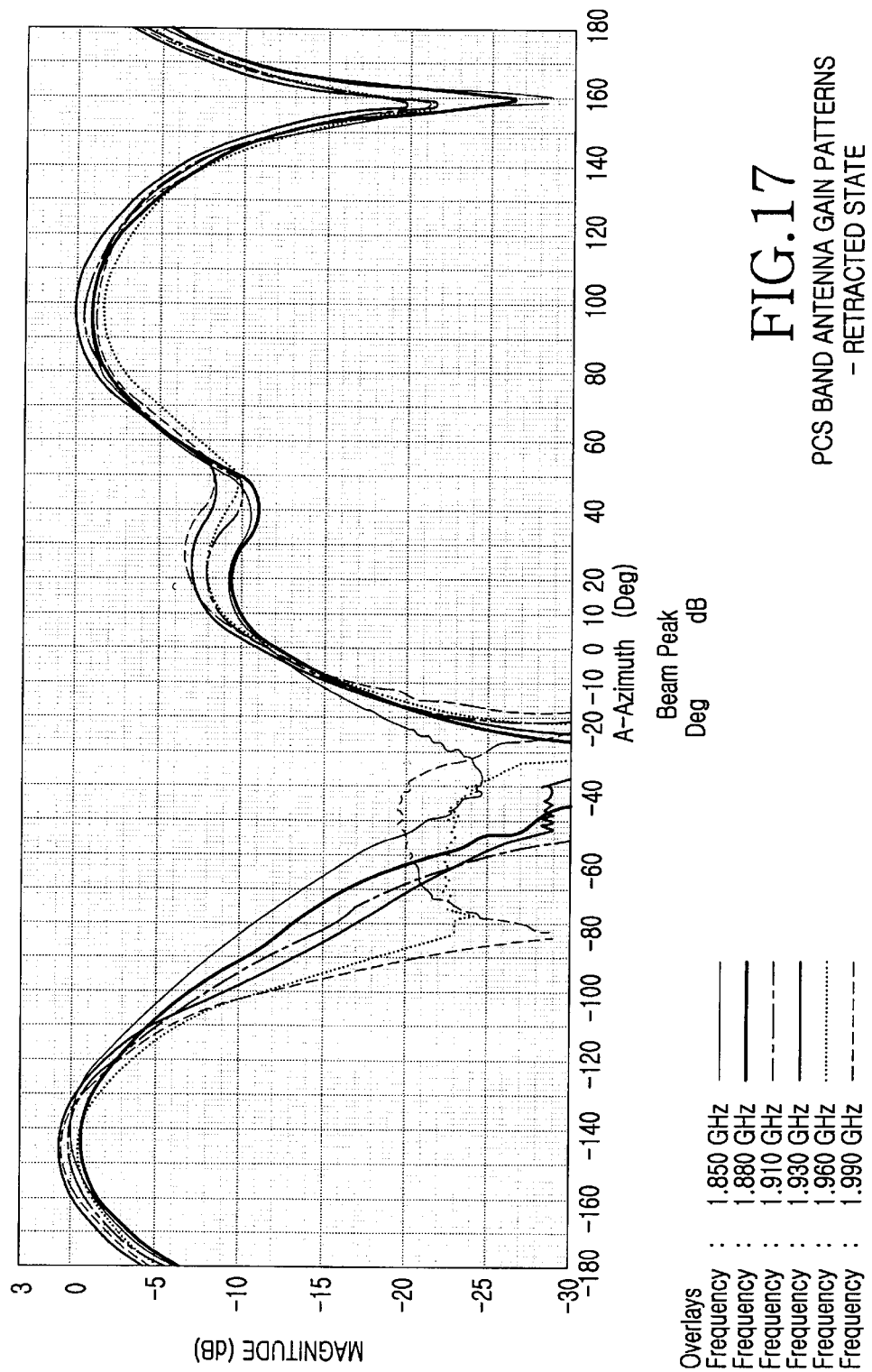
FIGS. 17 and 18 are diagrams showing PCS band antenna gain patterns of the dual band antenna shown in FIG. 10, which is in retracted and extended states in free space.
Figure 18:
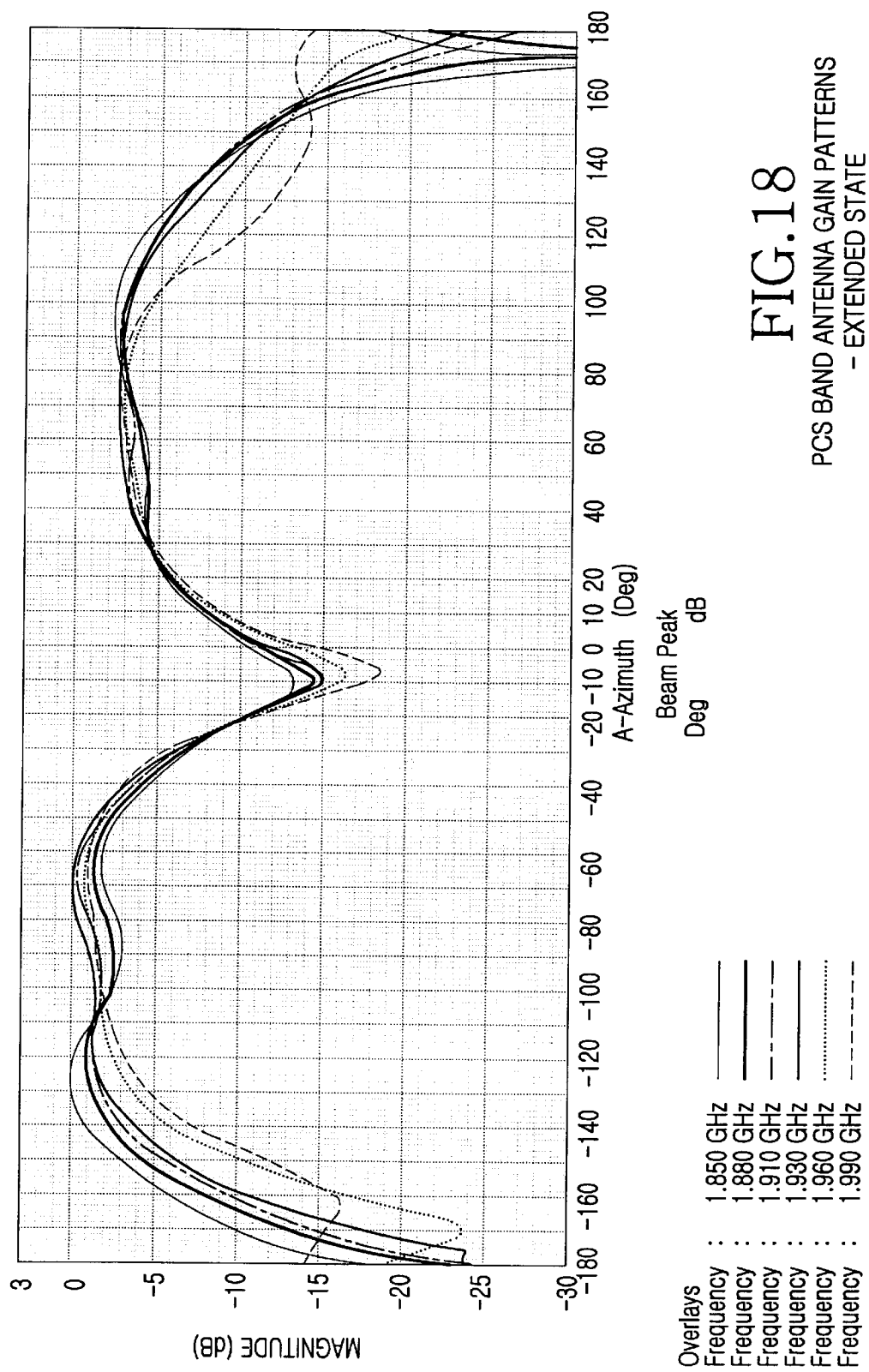
Figure 19:
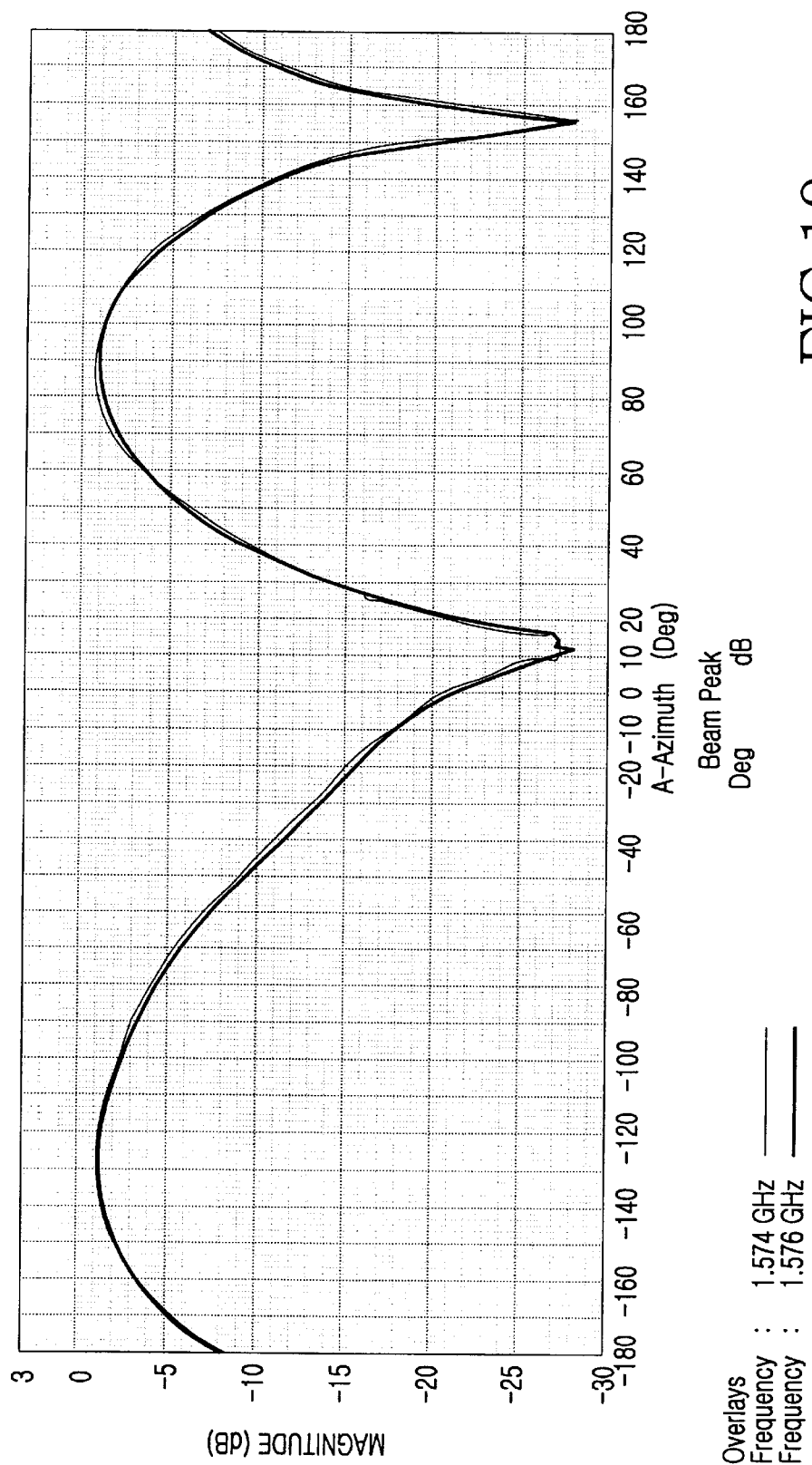
FIGS. 19 and 20 are diagrams showing GPS band antenna gain patterns of the dual band antenna shown in FIG. 10, which is in retracted and extended states in free space.
Figure 20:
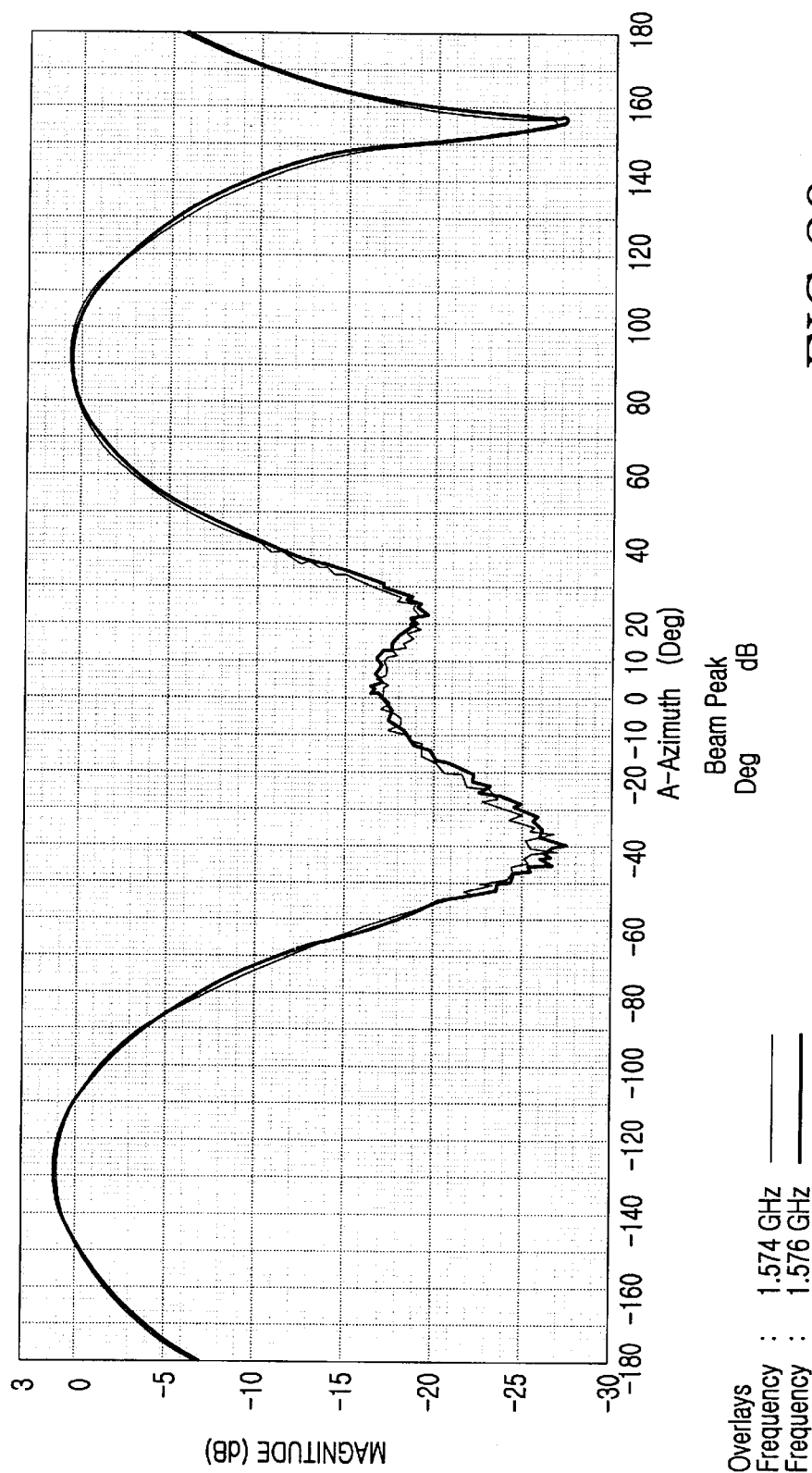

Further, the experiments show that there is no problem in the aspect of the antenna gain. According to measurements of antenna gain in retracted and extended states of the multi-band antenna 12 in free space, the antenna gain of the multi-band antenna 12 at CDMA/PCS bands has nearly the same pattern or characteristic as that of the existing dual band antenna, as shown in FIGS. 15 to 17. Also, in the retracted and extended states in free space, the multi-band antenna 12 according to the present invention has nearly the same antenna gain as that of the GPS chip type antenna, as shown in FIGS. 19 and 20. It is noted that the multi-band antenna 12 has superior gain to that of the GPS chip antenna in the extended state.

Figure 21:
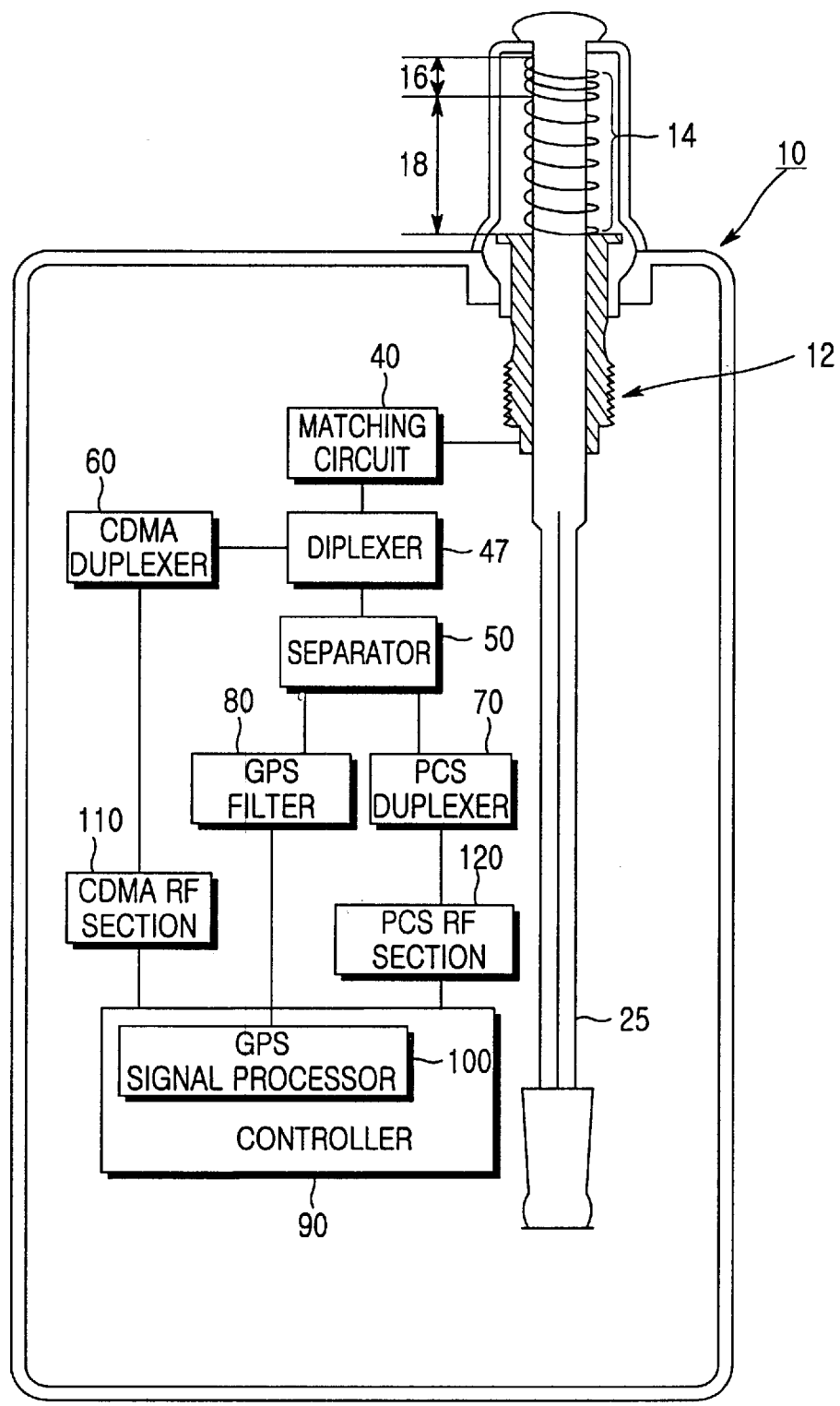
FIG. 21 schematic is a view including a block diagram, which illustrates a construction of a mobile communication system having a multi-band antenna according to the second preferred embodiment of the present invention.

FIG. 21 is a schematic view containing a block diagram, which illustrates a construction of a mobile communication system having a multi-band antenna according to the second preferred embodiment of the present invention. The mobile communication system according to the present embodiment is different from the mobile communication system shown in FIG. 10, in that the mobile communication system according to the present embodiment employs a passive switch such as a diplexer 47 instead of the active switch. In the case where the passively operating main diplexer 47 is employed, since the duplexers pass the low frequency band signal of 800 to 900 MHz and the high frequency band signal of 1.7 to 2.0 GHz respectively, one desired signal among three signals can be first separated by the diplexer, and then the other two signals can be separated by the separator 50.

In the case where the diplexer 47, which is a passive element, as shown in FIG. 21, the CDMA band signal, which is a low frequency band signal, and the GPS/PCS band signal, which are high frequency band signals, are first separated, and then GPS band signal and PCS band signal are separated from each other by the separator 50.

Therefore, it is understood that, differently from the case of employing the active switch 45, the GPS signal and the communication signals including the CDMA/PCS signals can be separated and then supplied through different paths to the GPS filter 80 and the CDMA and PCS duplexers 60 and 70 according to the frequency bands, even without the path control signal 92. The remaining operation of the mobile communication system according to the present embodiment is the same as that of mobile communication system shown in FIG. 10.

In the case where the signals of three different frequency bands are separated from each other by means of the passive switch element as shown in FIG. 21, experiments have shown the same results as that shown in FIGS. 11 to 20.

Although the above description is given to the case in which the mobile communication system according to the present invention has a GPS information processing function in addition to the CDMA and PCS mode processing functions of the existing dual mode mobile communication system, it will be understood by those of ordinary skill in the art that the present invention can be applied to similar cases, for example, the present invention can realize a mobile communication system having functions of processing GSM/GPS/DCS modes, that is, Global System for Mobile Communications/Global Positioning System/Digital Cellular System modes.

As described above, the present invention provides a mobile communication system, which can transmit and receive multi-band signals having different frequency bands such as GPS, CDMA, and PCS bands by means of only one antenna, thereby realizing a more compact mobile communication system capable of performing the E911 mode service.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A mobile communication system having a multi-band antenna, comprising:
   a GPS processing section for receiving a signal of a first frequency band, so as to generate global positioning information;
   a communication signal processing section for receiving signals of a second frequency band and a third frequency band, demodulating the received signals, and signals to be transmitted of the second frequency band and the third frequency band and outputting the modulated signals, the second frequency band being lower than the first frequency band and the third frequency band being higher than the first frequency band;

a multi-band antenna for receiving and transmitting signals of multiple frequency bands including the first to third frequency bands, the multi-band antenna including a dual-pitch helical antenna which includes first and second helical coil portions connected in series to each other, the first and second helical coil portions having pitches different from each other, so that the first and second helical coil portions have different impedances for the signals of the first to third frequency bands;

a frequency band separator section connected between the multi-band antenna and the GPS processing section and communication signal processing section, the frequency band separator section supplying the signal of the first frequency band to the GPS processing section while supplying the signals of the second and third frequency bands to the communication signal processing section, the frequency band separator section supplying signals, which are outputted from the GPS processing section and the communication signal processing section, to the multi-band antenna; and a control section for controlling the GPS processing section and the communication signal processing section.

2. A mobile communication system as claimed in claim 1, wherein the first frequency band is about 1.57 GHz, the second frequency band is about 800 to 900 MHz and the third frequency band is about 1.7 to 2.0 GHz.

3. A mobile communication system as claimed in claim 1, wherein the multi-band antenna is a retractable type antenna employing a dual-pitch helical antenna along with a whip antenna.

4. A mobile communication system as claimed in claim 1, wherein the multi-band antenna is a triple-band antenna capable of receiving signals of not only dual bands of CDMA/PCS but also a GPS band.

5. A mobile communication system as claimed in claim 1, wherein the frequency band separator section comprises:

a switch for electrically connecting the multi-band antenna to either the and the communication signal processing section or the GPS processing section in response to a path control signal outputted from the control section;

a separator for separating and outputting signals of the second and third frequency bands, and for supplying signals of the second and third frequency bands to the switch; and a CDMA duplexer and a PCS duplexer for supplying signals of the second and third frequency bands, outputted from the separator, to CDMA and PCS RF sections in the communication signal processing section, respectively, and for supplying signals of the second and third frequency bands, outputted from the CDMA and PCS RF sections, to the separator, respectively.

6. A mobile communication system as claimed in claim 5, wherein the separator is disposed between and connected to the switch and the communication signal processing section.

7. A mobile communication system as claimed in claim 4, wherein the control section sends the path control signal to the switch for a predetermined period of time in response to an E911 mode, and controls the GPS processing section and the communication signal processing section.

8. A mobile communication system as claimed in claim 1, wherein the frequency band separator section comprises:

a diplexer for separating signals received through an electric wave path of the multi-band antenna into signals of the second frequency band and signals of a frequency band higher than the second frequency band, the diplexer supplying the signal of the second frequency band to a CDMA RF section in the communication signal processing section;

a separator for separating the signals of the frequency band higher than the second frequency band into the signals of the first and third frequency bands, supplying the signal of the first frequency band to the GPS processing section, and synthesizing inputted signals of the first and third frequency bands;

a CDMA duplexer for supplying the signal of the second frequency band to CDMA FR section in the communication signal processing section; and a PCS duplexer for supplying the signal of the third frequency band to a PCS RF section in the communication signal processing section.

* * * * *